W. BUTLER.
BEET CHOPPER.
APPLICATION FILED JULY 30, 1917.

1,250,794.

Patented Dec. 18, 1917.

INVENTOR
WILLIAM BUTLER
BY Hazard & Miller
ATTYS

UNITED STATES PATENT OFFICE.

WILLIAM BUTLER, OF LONG BEACH, CALIFORNIA.

BEET-CHOPPER.

1,250,794.  Specification of Letters Patent.  Patented Dec. 18, 1917.

Application filed July 30, 1917. Serial No. 183,591.

*To all whom it may concern:*

Be it known that I, WILLIAM BUTLER, a citizen of the United States, residing at Long Beach, in the county of Los Angeles and State of California, have invented new and useful Improvements in Beet-Choppers, of which the following is a specification.

My object is to improve the lay-out and details of construction of a beet chopper and to produce a beet chopper adapted for operation upon a plurality of rows of beets simultaneously.

Figure 1:
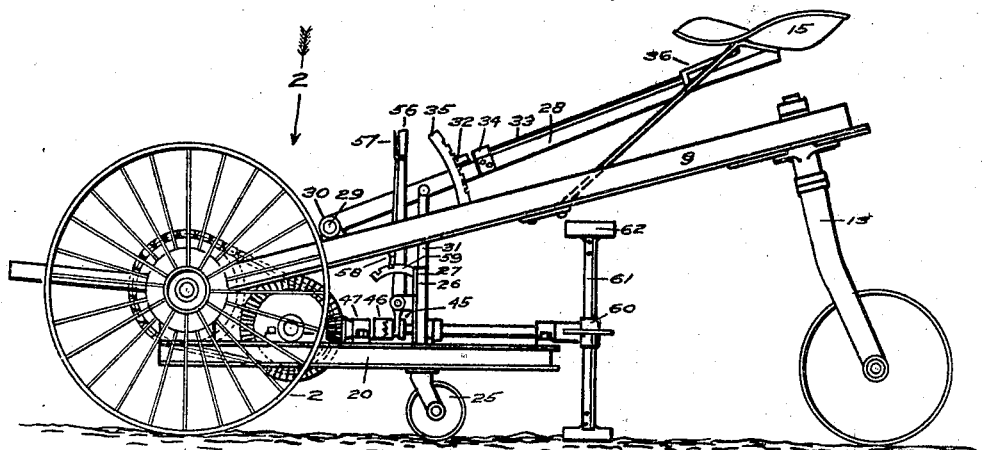
Figure 1 is a side elevation of a beet chopper embodying the principles of my invention and looking in the direction indicated by the arrow —1— in Fig. 2.

The traction wheels 1 and 2 are fixed upon the main axle 3 so as to rotate the axle. The main frame comprises bearings 4, 5, 6 and 7 in which the axle 3 rotates, side bars 8 and 9 extending from the bearings 4 and 7 backwardly and upwardly and parallel to each other, the rear cross bar 10 connecting the rear ends of the side bars 8 and 9 and parallel with the axle 3, and intermediate bars 11 and 12 connecting the bearings 5 and 6 to the rear bar 10. The frame thus constructed is inclined in side elevation, the rear end being substantially twice as high as the forward end, and a caster 13 supports the rear end. A base-plate 14 is inserted crosswise at the centers of the bars 11 and 12 and supports the seat 15. A tongue 16 is provided for applying any sort of power.

The secondary frame comprises the hangers 17 and 18 mounted upon the axle 3 between the wheels 1 and 2 and the bearings 4 and 7 and extending downwardly, the side bars 19 and 20 connected to the lower ends of the hangers 17 and 18, the cross bar 21 connecting the rear ends of the side bars 19 and 20, and the intermediate supporting bars 22 and 23 connecting the side bars 19 and 20 intermediate of the axle 3 and the rear bar 21. Caster wheels 24 and 25 extend downwardly from the bar 23 and in positions to run between the rows of beets and support the rear part of the secondary frame. In side elevation the secondary frame is normally level.

Posts 26 extend uuwardly from the bar 23, and a bar 27 is rigidly mounted upon the upper ends of these posts parallel with the bar 23. A hand-lever 28 is mounted upon the pivot 29 in the bearing block 30 fixed upon the bar 11, and a link 31 connects the hand-lever to the bar 27. A pawl 32 is mounted upon the end of the draw-bar 33 in the bearing 34 fixed to the hand-lever 28 and engages the toothed-rack 35 extending upwardly from the bar 11. A grip 36 upon the hand-lever operates the pawl 32 so that by manipulating the grip 36 and the hand-lever 28 the secondary frame may be raised or lowered.

The main driving shaft 37 is mounted in bearings near the forward ends of the bars 19 and 20 of the secondary frame, and a chain 38 connects the sprocket 39 upon the shaft 37 to the driving sprocket 40 fixed upon the axle 3, so that as the machine moves forwardly upon the ground the rotation of the traction wheels 1 and 2 will rotate the shaft 37.

The chopper shafts 41, 42, 43 and 44 are mounted longitudinally upon the bars 21, 22 and 23 and in parallel positions. Clutch members 45 are slidingly splined upon the shafts 41, 42, 43 and 44, and complementary clutch members 46 are loosely mounted upon the shafts behind the bearings 47 and are rigidly connected to the bevel pinions 48, 49, 50 and 51, said bevel pinions meshing with bevel gears 52, 53, 54 and 55 fixed upon the driving shaft 37. The hand-levers 56 have grips 57 controlling pawls 58 engaging racks 59 fixed to the bar 27, and the lower ends of the levers engage the clutch members 45, so that by manipulating the hand-levers 56 any desired one of the shafts 41, 42, 43 and 44 may be thrown into or out of gear. Chopper heads 60 are fixed upon the rear ends of the shafts 41, 42, 43 and 44, arms 61 extend radially from the heads, and chopping blades 62 are fixed upon the outer ends of the arms, so that when the choppers are in gear and the machine moves forwardly the blades 62 will strike the row of beets at intervals and chop out spaces five or six inches long in the rows.

Figure 2:
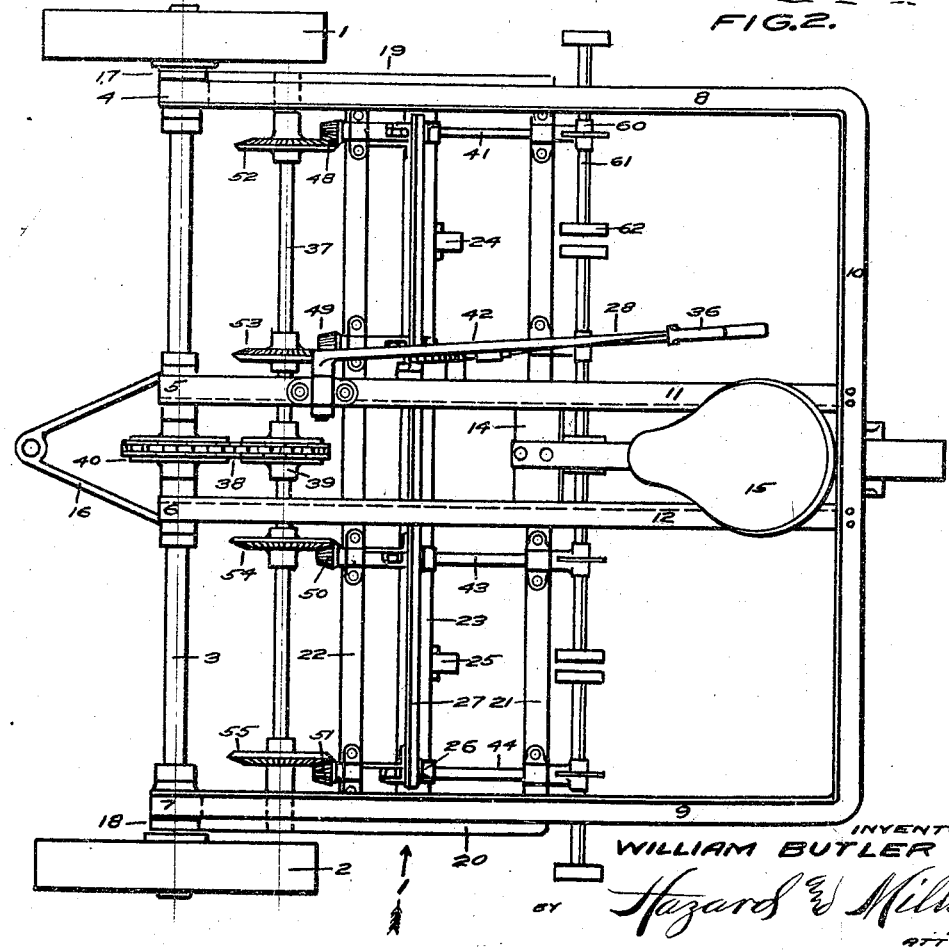
Fig. 2 is a top plan view.

In raising sugar beets, the seeds are planted in continuous rows about eighteen inches apart and when the plants are very young the chopper is used to cut out spaces in the rows as a preliminary operation in thinning the beets. The machine shown in Fig. 2 is adapted for simultaneously operating upon four parallel rows of beets. The blades may be from four to six inches long and the choppers should be geared so that the blades will strike at intervals and leave hills of beets between the spaces cut out.

Various changes may be made in the details of construction and the machine may be made to operate upon any desired number of rows without departing from the spirit of my invention as set up in the following claims:

I claim:

1. A beet chopper comprising an axle, traction wheels rigidly fixed upon the axle, a main frame having bearings in which the axle rotates, a caster under the rear of the main frame, a secondary frame under the main frame and supported at the front by the axle, casters supporting the rear of the secondary frame, a driving shaft in the secondary frame parallel with the axle and driven from the axle, and a plurality of chopper shafts upon the secondary frame and connected to the driving shaft.

2. A beet chopper comprising an axle, traction wheels rigidly fixed upon the axle, a main frame having bearings in which the axle rotates, a caster under the rear of the main frame, a secondary frame under the main frame and supported at the front by the axle, casters supporting the rear of the secondary frame, a driving shaft in the secondary frame parallel with the axle and driven from the axle, a plurality of chopper shafts upon the secondary frame, and clutches for connecting the chopper shafts to the driving shaft.

3. A beet chopper comprising an axle, traction wheels rigidly fixed upon the axle, a main frame having bearings in which the axle rotates, a caster under the rear of the main frame, a secondary frame under the main frame and supported at the front by the axle, casters supporting the rear of the secondary frame, a driving shaft in the secondary frame parallel with the axle and driven from the axle, a plurality of chopper shafts upon the secondary frame and connected to the driving shaft, and adjustable means for raising and lowering the rear of the secondary frame.

4. A beet chopper comprising an axle, traction wheels rigidly fixed upon the axle, a main frame having bearings in which the axle rotates, a caster under the rear of the main frame and holding the rear higher than the front, a secondary frame under the main frame and having hangers in which the axle rotates, casters supporting the rear of the secondary frame on a level, a driving shaft in the secondary frame parallel with the axle and driven from the axle, a plurality of chopper shafts upon the secondary frame at right angles to the driving shaft, bevel gears for connecting the chopper shafts to the driving shaft, clutches for throwing the chopper shafts into and out of gear, and choppers upon the rear ends of the chopper shafts.

In testimony whereof I have signed my name to this specification.

WILLIAM BUTLER.

Copies of this patent may be obtained for five cents each, by addressing the "Commissioner of Patents, Washington, D. C."